(12) United States Patent
Ritter

(10) Patent No.: US 10,023,000 B2
(45) Date of Patent: Jul. 17, 2018

(54) SECURITY THREADS AND STRIPES

(71) Applicant: SICPA HOLDING SA, Prilly (CH)

(72) Inventor: Gebhard Ritter, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 49 days.

(21) Appl. No.: 15/118,549

(22) PCT Filed: Jan. 20, 2015

(86) PCT No.: PCT/EP2015/050966
§ 371 (c)(1),
(2) Date: Aug. 12, 2016

(87) PCT Pub. No.: WO2015/121028
PCT Pub. Date: Aug. 20, 2015

(65) Prior Publication Data
US 2017/0043608 A1    Feb. 16, 2017

(30) Foreign Application Priority Data

Feb. 13, 2014   (EP) .................................... 14154994

(51) Int. Cl.
*B42D 25/00*     (2014.01)
*B42D 25/369*    (2014.01)
(Continued)

(52) U.S. Cl.
CPC .............. *B42D 25/355* (2014.10); *B32B 5/16* (2013.01); *B42D 25/328* (2014.10);
(Continued)

(58) Field of Classification Search
CPC .......................... B42D 2033/16; B42D 25/369
See application file for complete search history.

(56) References Cited

U.S. PATENT DOCUMENTS 964,014 A    7/1910  Jules
4,609,207 A  9/1986  Hajo et al.
(Continued)

FOREIGN PATENT DOCUMENTS

CN    102781629    11/2012
CN    102956147     3/2013
(Continued)

OTHER PUBLICATIONS

"Chemistry & Technology of UV & EB Formulation for Coatings, Inks & Paints", published in 7 volumes in 1997-1998 by John Wiley & Sons in association with SITA Technology Limited.
(Continued)

*Primary Examiner* — Kyle R Grabowski
(74) *Attorney, Agent, or Firm* — Muncy, Geissler, Olds & Lowe, P.C.

(57) ABSTRACT

The present invention relates to the field of the protection of value documents and value commercial goods against counterfeit and illegal reproduction. In particular, the present invention relates to security threads or stripes comprising a holographic metallic layer; a first transparent substrate; a second transparent substrate; a first hardened coating and a second hardened coating, wherein a first plurality of non-spherical magnetic or magnetizable pigment particles of the first hardened coating are oriented so as to follow a convex curvature and wherein the second plurality of non-spherical magnetic or magnetizable pigment particles of the second hardened coating are oriented so as to follow a concave curvature so as to form a plural rolling bar effect.

13 Claims, 3 Drawing Sheets

(51) Int. Cl.
*B42D 25/355* (2014.01)
*B42D 25/45* (2014.01)
*B42D 25/328* (2014.01)
*B42D 25/364* (2014.01)
*B42D 25/373* (2014.01)
*B42D 25/378* (2014.01)
*B32B 5/16* (2006.01)
*B05D 3/00* (2006.01)
*B05D 7/00* (2006.01)

(52) U.S. Cl.
CPC ......... B42D 25/364 (2014.10); B42D 25/369 (2014.10); B42D 25/373 (2014.10); B42D 25/378 (2014.10); B42D 25/45 (2014.10); *B05D 3/207* (2013.01); *B05D 7/53* (2013.01); *B32B 2255/00* (2013.01); *B32B 2307/208* (2013.01); *B32B 2307/412* (2013.01); *B42D 2033/16* (2013.01); *B42D 2033/18* (2013.01); *B42D 2033/20* (2013.01)

(56) References Cited

U.S. PATENT DOCUMENTS

| | | | |
|---|---|---|---|
| 4,652,015 | A | 3/1987 | Timothy |
| 4,756,557 | A | 7/1988 | Wittich et al. |
| 4,838,648 | A | 6/1989 | Roger et al. |
| 4,897,300 | A | 1/1990 | Michael |
| 5,068,008 | A | 11/1991 | Timothy |
| 5,074,914 | A | 12/1991 | Katsuhiro |
| 5,324,079 | A | 6/1994 | Wittich et al. |
| 5,354,099 | A | 10/1994 | Wittich et al. |
| 5,997,622 | A | 12/1999 | Helmut et al. |
| 6,001,161 | A | 12/1999 | Steven et al. |
| 6,410,130 | B1 | 6/2002 | Peter et al. |
| 6,531,221 | B1 | 3/2003 | Peter et al. |
| 6,582,781 | B1 | 6/2003 | Peter et al. |
| 6,838,166 | B2 | 1/2005 | Roger et al. |
| 7,047,883 | B2 | 5/2006 | Vladimir et al. |
| 7,047,888 | B2 | 5/2006 | Bryan |
| 7,517,578 | B2 | 4/2009 | Vladimir et al. |
| 2005/0106367 | A1* | 5/2005 | Raksha ............ B42D 25/369 428/199 |
| 2006/0097515 | A1* | 5/2006 | Raksha ............ B42D 25/369 283/91 |
| 2006/0194040 | A1* | 8/2006 | Raksha ............ B42D 25/369 428/323 |
| 2007/0058227 | A1* | 3/2007 | Raksha ............ B42D 25/369 359/2 |
| 2007/0206249 | A1* | 9/2007 | Phillips ............ B42D 25/328 359/2 |
| 2007/0241553 | A1 | 10/2007 | Manfred et al. |
| 2009/0230670 | A1* | 9/2009 | Schmid ............ B42D 25/29 283/85 |
| 2011/0095518 | A1 | 4/2011 | Winfried et al. |
| 2012/0133121 | A1* | 5/2012 | Bleikolm ............ B42D 25/369 283/67 |
| 2013/0029112 | A1* | 1/2013 | Bargir ............ B42D 25/369 428/195.1 |
| 2014/0077485 | A1* | 3/2014 | Raksha ............ B42D 25/00 283/67 |

FOREIGN PATENT DOCUMENTS

| | | |
|---|---|---|
| EP | 0021350 | 1/1981 |
| EP | 0185396 | 6/1986 |
| EP | 0303725 | 2/1989 |
| EP | 0319157 | 6/1989 |
| EP | 0518740 | 12/1992 |
| EP | 0608078 | 7/1994 |
| EP | 0686675 | 2/1998 |
| EP | 1498545 | 1/2005 |
| EP | 1666546 | 6/2006 |
| EP | 1710756 | 10/2006 |
| EP | 2402401 | 1/2012 |
| EP | 2465701 | 6/2012 |
| JP | 62-190272 | 8/1987 |
| JP | 63-218766 | 9/1988 |
| JP | 02-080470 | 3/1990 |
| WO | 1990008367 | 7/1990 |
| WO | 1992011142 | 7/1992 |
| WO | 1996004143 | 2/1996 |
| WO | 1996039685 | 12/1996 |
| WO | 1998019866 | 5/1998 |
| WO | 2002073250 | 9/2002 |
| WO | 2003000801 | 1/2003 |
| WO | 2004048120 | 6/2004 |
| WO | 2006063926 | 6/2006 |
| WO | 2007042865 | 4/2007 |
| WO | 2007131833 | 11/2007 |
| WO | 2009033601 | 3/2009 |
| WO | 2011072405 | 6/2011 |
| WO | 2011107527 | 9/2011 |
| WO | 2012014098 | 2/2012 |
| WO | 2012104098 | 8/2012 |

OTHER PUBLICATIONS

Crivello et al., Chemistry & Technology of UV & EB Formulation for Coatings, Inks & Paint, vol. III, "Photoinitiators for Free Radical Cationic and Anionic Polymerization", 2nd Edition, by John Wiley & Sons in association with SITA Technology Limited, 1998, PP.
Chinese office action in counterpart Chinese Application No. 201580008370.2 dated Apr. 1, 2017 (and English Language Translation).

* cited by examiner

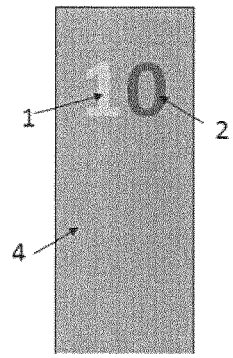 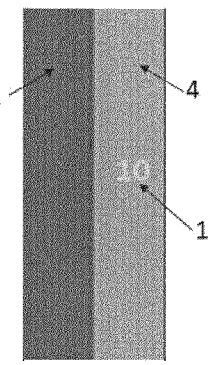 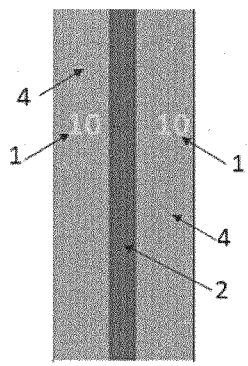 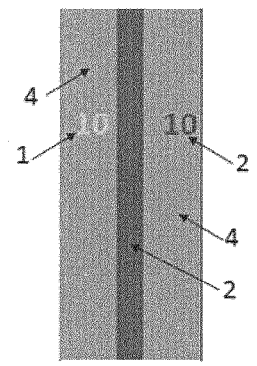
Fig. 4I    Fig. 4J    Fig. 4K    Fig. 4L
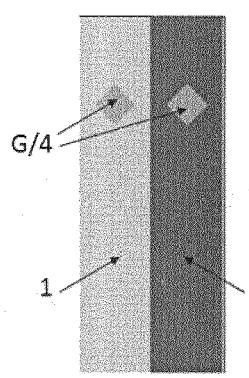 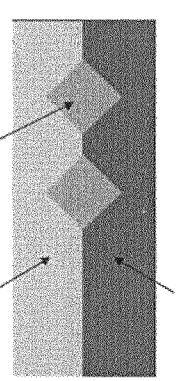 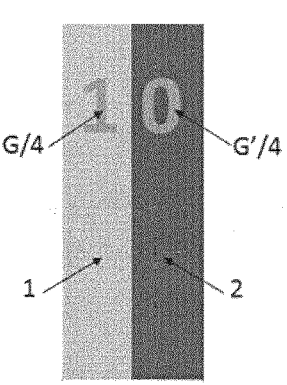
Fig. 4M    Fig. 4N    Fig. 4O
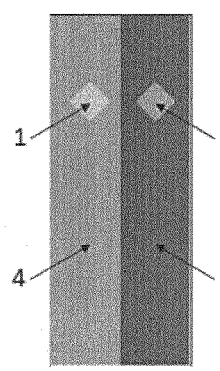 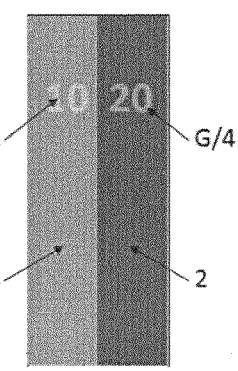
Fig. 4P    Fig. 4Q

SECURITY THREADS AND STRIPES

CROSS-REFERENCE TO RELATED APPLICATIONS

The present application is a U.S. National Stage of International Patent Application No. PCT/EP2015/050966 filed Jan. 20, 2015, and claims priority of European Patent Application No. 14154994.9 filed Feb. 13, 2014. Moreover, the disclosure of International Patent Application No. PCT/EP2015/050966 is expressly incorporated by reference herein in its entirety.

FIELD OF THE INVENTION

The present invention relates to the field of the protection of value documents and value commercial goods against counterfeit and illegal reproduction. In particular, the present invention relates to security threads or stripes to be incorporated into or onto security documents, said security threads or stripes exhibiting highly dynamic visual motion effect upon tilting.

BACKGROUND OF THE INVENTION

With the constantly improving quality of color photocopies and printings and in an attempt to protect security documents such as banknotes, value documents or cards, transportation tickets or cards, tax banderols, and product labels against counterfeiting, falsifying or illegal reproduction, it has been the conventional practice to incorporate various security means in these documents. Typical examples of security means include security threads or stripes, windows, fibers, planchettes, foils, decals, holograms, watermarks, security inks comprising optically variable pigments, magnetic or magnetizable thin film interference pigments, interference-coated particles, thermochromic pigments, photochromic pigments, luminescent, infrared-absorbing, ultraviolet-absorbing or magnetic compounds.

Security threads embedded in the substrate are known to those skilled in the art as an efficient means for the protection of security documents, in particular banknotes, against imitation. Reference is made to U.S. Pat. No. 0,964,014; U.S. Pat. No. 4,652,015; U.S. Pat. No. 5,068,008; U.S. Pat. No. 5,324,079; WO 90/08367 A1; WO 92/11142 A1; WO 96/04143 A1; WO 96/39685 A1; WO 98/19866 A1; EP 0 021 350 A1; EP 0 185 396 A2; EP 0 303 725 A1; EP 0 319 157 A2; EP 0 518 740 A1; EP 0 608 078 A1; and EP 1 498 545 A1 as well as the references cited therein. A security thread is a metal- or plastic-filament, which is incorporated during the manufacturing process into the substrate serving for printing security documents or banknotes. Security threads or stripes carry particular security elements, serving for the public- and/or machine-authentication of the security document, in particular for banknotes. Suitable security elements for such purpose include without limitation metallizations, optically variable compounds, luminescent compounds, micro-texts and magnetic features.

With the aim of protecting value documents such as banknotes from being forged, optically variable security threads or stripe exhibiting color shift or color change upon variation of the angle of observation have been proposed as security features to be incorporated into or onto said value documents. The protection from forgery is based on the variable color effect that optically variable security elements convey to the viewer in dependence on the viewing angle or direction. Reference is made to WO 2004/048120 A1, US 2007/0241553, WO 2007/042865, US 2011/0095518 and EP 2 465 701 A2 as well as the references cited therein.

In addition to static security features used for protecting security documents against counterfeit and illegal reproduction, dynamic security features providing the optical illusion of movement have been developed. In particular, security elements based on oriented magnetic or magnetizable pigments and magnetic or magnetizable optically variable pigments have been developed so as to provide an optical illusion of movement.

WO 2011/107527 A1 discloses thread and stripes comprising a plastic foil which carries a hardened coating comprising oriented magnetic or magnetizable pigment particles, in particular optically variable magnetic or magnetizable pigment particles, the orientation of said pigment particles representing graphic information.

U.S. Pat. No. 7,047,883 discloses the creation of a dynamic optically variable effect known as the "rolling bar" feature. The "rolling bar" feature provides the optical illusion of movement to images comprised of oriented magnetic or magnetizable pigments. U.S. Pat. No. 7,517,578 and WO 2012/104098 A1 respectively disclose "double rolling bar" and "triple rolling bar" features, said features seeming to move against each other upon tilting. A printed "rolling bar" type image shows one or contrasting bands which appear to move ("roll") as the image is tilted with respect to the viewing angle. Such images are known to be easily recognized by the man on the street and the illusive aspect cannot be reproduced by commonly available office equipment for color scanning, printing and copying. "Rolling bar" features are based on a specific orientation of magnetic or magnetizable pigments. In particular, the magnetic or magnetizable pigments are aligned in a curving fashion, either following a convex curvature (also referred in the art as negative curved orientation) or a concave curvature (also referred in the art as positive curved orientation).

WO 2012/104098 A2 discloses a method for producing "triple rolling bar" features, said method comprising the steps of: a) applying a coating composition comprising magnetic or magnetizable pigment particles onto a substrate; b) orienting said magnetic or magnetizable pigment particles according to a first curved surface by applying a first magnetic field; c) selectively hardening said applied coating composition in first areas, hereby fixing the magnetic pigment particles in their positions and orientations; d) orienting said magnetic or magnetizable pigment particles in the unhardened part of the coating composition according to a second curved surface by applying a second magnetic field; e) hardening said applied coating composition in second areas, hereby fixing the magnetic pigment particles in their positions and orientations. For achieving an area comprising pigments particles oriented to follow a negative curvature and an area comprising pigments particles oriented to follow a positive curvature, the disclosed method requires on one hand to orient the pigments particles by applying a magnetic-field generating device from the bottom of the substrate and, on the other hand, by applying a magnet from the top of the substrate.

However, disclosed methods to obtain a security element comprising a substrate and combining at least two areas, one area comprising magnetic or magnetizable pigment particles oriented so as to follow a negative curvature and another area comprising magnetic or magnetizable oriented to follow a positive curvature require a step of applying a magnetic-field generating device from above the substrate, i.e. the device faces the not yet hardened composition comprising the magnetic or magnetizable pigment particles, therefore increasing the complexity of the overall manufacturing process of the security element. For example, the not yet hardened composition should not be placed in direct contact with the magnetic-field generating device so as to avoid or exclude any deterioration of the optical effect. Moreover, since the strength of a magnetic field decreases rapidly with distance, if the magnetic-field generating device is positioned at a large distance from the not yet hardened composition to avoid direct contact, the orientable pigment particles will be oriented by a weaker magnetic field resulting in a less striking optical effect.

A need remains for providing sophisticated security threads or stripes combining high visual attractiveness with a highly sophisticated design so as to further increase the resistance against counterfeiting or illegal reproduction of security documents comprising said security threads or stripes. A need also remains for a simpler and more efficient process for producing said sophisticated security threads or stripes.

SUMMARY

Accordingly, it is an object of the present invention to overcome the deficiencies of the prior art as discussed above. This is achieved by the provision of security threads or stripe comprising:
a) a first hardened coating comprising a first plurality of oriented non-spherical magnetic or magnetizable pigment particles,
b) a second hardened coating comprising a second plurality of oriented non-spherical magnetic or magnetizable pigment particles,
c) a holographic metallic layer; and
d) a first transparent substrate and a second transparent substrate
wherein the first hardened coating and the second hardened coating comprise one or more gaps in the form of indicia or consist of indicia,
wherein the first hardened coating, the second hardened coating and the holographic metallic layer are at least partially jointly visible from one side of the side of the security thread or stripe, and
wherein the first plurality of non-spherical magnetic or magnetizable pigment particles are oriented so as to follow a convex curvature when viewed from the one side of the security thread or stripe where the first hardened coating, the second hardened coating and the holographic metallic layer are at least partially jointly visible and wherein the second plurality of non-spherical magnetic or magnetizable pigment particles are oriented so as to follow a concave curvature when viewed from the one side of the security thread or stripe where the first hardened coating, the second hardened coating and the holographic metallic layer are at least partially jointly visible so as to form a plural rolling bar effect.

Also described and claimed therein are processes for making security thread or stripe described herein and security threads or stripes obtained thereof, said process comprising a step of laminating a) a first structure comprising the first transparent substrate, the holographic metallic layer and the first hardened coating comprising non-spherical magnetic or magnetizable pigment particles oriented so as to follow a convex curvature when viewed from the side carrying the first hardened coating with b) a second structure comprising the second transparent substrate and the second hardened coating comprising the non-spherical magnetic or magnetizable pigment particles oriented so as to follow a convex curvature when viewed from the side carrying the second hardened coating,
wherein the first hardened coating and the second hardened coating being are comprised between the two transparent substrates so as to form a laminated structure and wherein the holographic metallic layer is either comprised between the two transparent substrates or faces the environment,
wherein the first hardened coating and the second hardened coating and the holographic metallic layer are at least partially jointly visible from one side of the security thread or stripe, and
wherein the laminated structure comprises one of the first hardened coating and second hardened coating comprising non-spherical magnetic or magnetizable pigment particles having an orientation following a convex curvature and the other of the first hardened coating or the second hardened coating comprising the non-spherical magnetic or magnetizable pigment particles having an orientation following a concave curvature so as to form a plural rolling bar effect.

Also described and claimed therein are uses of the security threads or stripes described herein for the protection of a security document against counterfeiting, fraud or illegal reproduction as well as security documents comprising said security threads or stripes.

Also described and claimed therein are processes for producing security documents comprising the security threads or stripes described herein and security documents obtained thereof, said processes comprising the steps of:
a) producing the security thread or stripe described herein, and
b) at least partially embedding in said security document the security thread or stripe obtained under step a) or mounting the security thread or stripe obtained under step a) on the surface of the security document.

The combination of the specific layers described herein provides the security thread more varieties in visual effects in comparison with traditional holographic threads of the prior art. Such a combination enhances the resistance upon circulation and time of the security thread or stripe and enhances the security and visibility of said security thread or stripe and thus increases the difficulty of the counterfeiting. Moreover, the present invention provides simpler and more efficient processes for producing the security threads and stripes described herein.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the term "about" in conjunction with an amount or value means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within 3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B". In case of "only B", the term also covers the possibility that A is absent, i.e. "only B, but not A".

The term "comprising" as used herein is intended to be non-exclusive and open-ended. Thus, for instance a composition comprising a compound A may include other compounds besides A.

A thread or stripe consists of an elongated security element. By "elongated", it is meant that the dimension of the security element in the longitudinal direction is more than twice as large as its dimension in the transverse direction.

As used herein, the term "indicia" shall mean discontinuous layers such as patterns, including without limitation symbols, alphanumeric symbols, motifs, geometric patterns, letters, words, numbers, logos and drawings.

As used herein, the term "pigment" is to be understood according to the definition given in DIN 55943: 1993-11 and DIN EN 971-1: 1996-09. Pigments are materials in powder or flake form which are—contrary to dyes—not soluble in the surrounding medium.

As used herein, the terms "match" or "matched" is to be understood to mean that two color impressions substantially appear to be identical.

As used herein, the terms "convex" and "concave" when related to the security thread or stripe described herein are always in reference with the observation view from the side of the security thread or stripe where the first hardened coating, the second hardened coating and the holographic metallic layer are at least partially jointly visible.

As used herein, the terms "convex" and "concave" when related to the first structure and the second structure described herein are always in reference with the observation view from the side of the structure carrying the hardened coating.

Figure 1A:
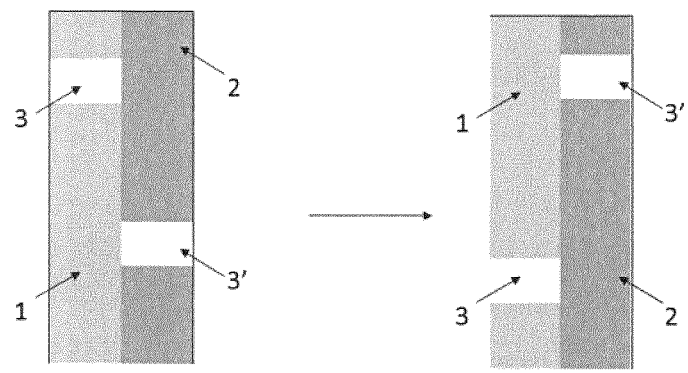
FIG. 1A-B schematically illustrate top views of a security thread exhibiting a double rolling bar effect upon tilting.
Figure 1B:
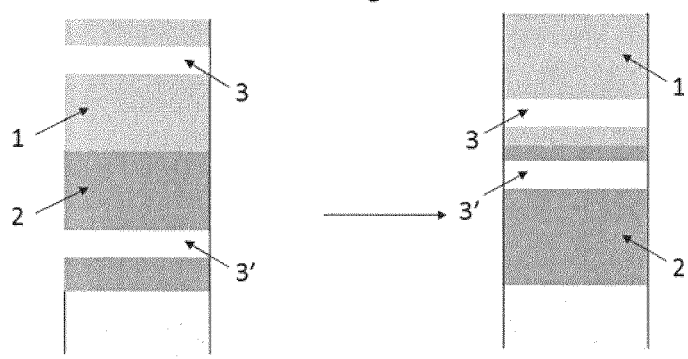

The present invention provides security threads or stripes and processes for producing said security threads or stripes exhibiting a plural rolling bar effect. According to one embodiment, the security threads or stripes comprises, in addition to the holographic metallic layer, two areas, i.e. two hardened coatings, exhibiting a rolling bar effect (also referred as double rolling bar effect), wherein the rolling bar effect of one area is different from the rolling bar effect of the other area in terms of rolling effect (see FIG. 1A-B, wherein the security thread comprises a first hardened coating (1) and a second hardened coating (2) having opposite rolling bar effects, the holographic metallic layer being omitted for clarity of illustration). FIG. 1A-B illustrate top views of security threads or stripes exhibiting a double rolling bar effect, said double rolling bar effect being obtained by the combination of a first hardened coating (1) and a second hardened coating (2) exhibiting two different rolling effects, said first and second hardened coatings comprising oriented non-spherical magnetic or magnetizable pigment particles. As with the tilt of the security thread or stripe with respect to the viewing angle (illustrated by an arrow in FIG. 1A-B), two light bands or bars (3, 3') appear to move or roll across the security thread or stripe in opposite directions.

According to another embodiment, the present invention provides security threads or stripes comprising, in addition to the holographic metallic layer, three areas, i.e. three hardened coatings exhibiting a rolling bar effect (also referred as triple rolling bar effect), wherein the rolling bar effect of one area is different from the rolling bar effect of the two other areas. According to another embodiment, the present invention provides security threads or stripes comprising, in addition to the holographic metallic layer, more than three areas, i.e. more than three hardened coatings, exhibiting a rolling bar effect, wherein the rolling bar effect of one area is different from the rolling bar effect of the other areas.

Figure 2A:
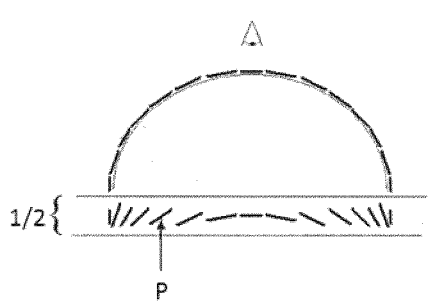
FIG. 2A schematically illustrates magnetic or magnetizable pigment particles orientation following a negative curve (convex orientation) when viewed from the side carrying the hardened coating.
Figure 2B:
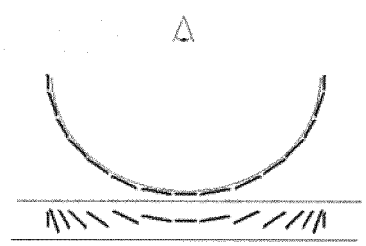
FIG. 2B schematically illustrates magnetic or magnetizable pigment particles orientation following a positive curve (concave orientation) when viewed from the side carrying the hardened coating.

As mentioned hereabove, "rolling bar" effects or features are based on a specific orientation of magnetic or magnetizable pigment particles in a hardened coating. Magnetic or magnetizable pigments particles in a binder material are aligned in an arching pattern relative to a surface of the substrate so as to create a contrasting bar across the image said contrasting bar appearing to move as the image is tilted relative to a viewing angle. In particular, the magnetic or magnetizable pigment particles are aligned in a curving fashion, either following a convex curvature (also referred in the art as negative curved orientation, see FIG. 2A) or a concave curvature (also referred in the art as positive curved orientation, see FIG. 2B). A hardened coating comprising pigment particles having an orientation following a convex curvature (negative curved orientation) shows a visual effect characterized by a downward movement of the rolling bar when the security thread or stripe is tilted backwards (i.e. the top of the security thread or stripe moves away from the observer while the bottom of the security thread or stripe moves towards from the observer). A hardened coating comprising pigment particles having an orientation following a concave curvature (positive curved orientation) shows a visual effect characterized by an upward movement of the rolling bar when the security thread or stripe is tilted backwards.

Figure 2C:
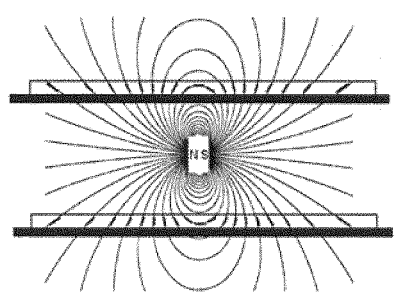
FIG. 2C schematically illustrates a magnetic-field generating device suitable for forming a magnetic field in a convex fashion or a concave fashion as a function of its position.

As described in the prior art, for example in U.S. Pat. No. 7,047,888, U.S. Pat. No. 7,517,578 and WO 2012/104098 A1 and as illustrated in FIG. 2C, known methods to obtain on a substrate a magnetic or magnetizable pigment particles orientation following a negative curve (convex curvature when viewed from the side carrying the hardened coating, illustrated by an eye, see FIG. 2A) include the use of a magnetic-field generating device to orient the pigment particles, said device being placed underneath the substrate (FIG. 2C, top). To obtain on a substrate a magnetic or magnetizable pigment particles orientation following a positive curve (concave curvature when viewed from the side carrying the hardened coating, illustrated by an eye, see FIG. 2B), the magnetic-field generating device used to orient the pigment particles is placed above the substrate (FIG. 2C, below), i.e. the device faces the coating comprising the magnetic or magnetizable pigment particles. In FIG. 1A-B, the first hardened coating (1) and the second hardened coating (2) exhibit two different rolling effects, i.e. one of said hardened coatings comprises magnetic or magnetizable pigment particles having an orientation following a convex curvature when viewed from the side carrying the hardened coating and the other coating comprises magnetic or magnetizable pigment particles having an orientation following a concave curvature when viewed from the side carrying the hardened coating. However and as mentioned hereabove, orienting magnetic or magnetizable pigment particles by applying a magnetic-field-generating device from the side facing the magnetic or magnetizable pigment particles strongly increases the complexity of the overall manufacturing process.

The security thread or stripe described herein comprises the two transparent substrates described herein, the first hardened coating described herein, the second hardened coating described herein and the holographic metallic layer described herein, wherein the first hardened coating, the second hardened coating and the holographic metallic layer are at least partially jointly visible from one side of the security thread or stripe. The first hardened coating and the second hardened coating only partly cover or superimpose the holographic metallic layer so that the holographic metallic layer can be seen through the uncovered part from one side of the security thread or stripe where the first hardened coating, the second hardened coating and the holographic metallic layer are at least partially jointly visible.

According to one embodiment, the first hardened coating, the second hardened coating and the holographic metallic layer described herein are comprised between the two transparent substrates, said two transparent substrates thus facing the environment. According to another embodiment, the first hardened coating and the second hardened coating described herein are comprised between the two substrates and the holographic metallic layer described herein faces one of said two transparent substrates and faces the environment. Should one of the first hardened coating and second hardened coating at least partially overlap or superimpose the other in the security thread or stripe described herein, said first hardened coating and second hardened coating have to be designed such that the first hardened coating, the second hardened coating and the holographic metallic layer are at least partially jointly visible from one side of the security thread or stripe.

Also described herein are security thread or stripe comprising a first structure and a second structure laminated to one another, wherein the first structure comprises the first transparent substrate described herein, the holographic metallic layer described herein and the first hardened coating comprising the non-spherical magnetic or magnetizable pigment particles oriented so as to follow a convex curvature when viewed from the side carrying the first hardened coating and the second structure comprises the second transparent substrate described herein and the second hardened coating comprising the non-spherical magnetic or magnetizable pigment particles oriented so as to follow a convex curvature when viewed from the side carrying second hardened coating, wherein the first hardened coating and the second hardened coating are comprised between the two transparent substrates so as to form a laminated structure and wherein the holographic metallic layer is either comprised between the two transparent substrates or faces the environment The first hardened coating and the second hardened coating comprise one or more gaps in the form of indicia or consist of indicia.

In an embodiment, the holographic metallic layer is arranged beneath the first and the second hardened coating and is at least partly revealed by the arrangement of the first and the second hardened coatings.

In an embodiment, the first hardened coating and the second hardened coatings only partly cover the holographic metallic layer so that the holographic metallic layer can be seen through the uncovered part from one side of the security thread or stripe where the first hardened coating, the second hardened coating and the holographic metallic layer are at least partially jointly visible.

Figure 3A:
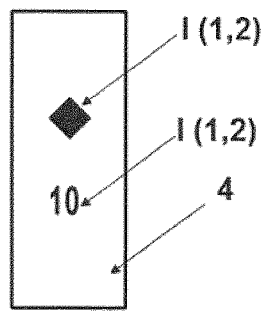
FIG. 3A-B schematically illustrate coatings consisting of indicia.
Figure 3B:
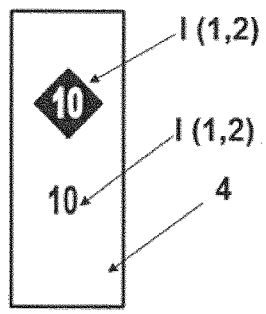

As shown in FIGS. 3A and 3B and when the first hardened coating (1) and/or the second hardened coating (2) consist of indicia I (1, 2), one or more regions lacking the first hardened coating (1) and/or the second hardened coating (2) as the case may be thus allow an observer to see the holographic metallic layer (4) through the one or more regions lacking the first hardened coating and/or the second hardened coating. As shown in FIG. 3B and when the first hardened coating (1) and/or the second hardened coating (2) in FIG. 3B) consist of indicia (I (1, 2), said indicia may comprise one or more material-free regions within said coating ("10" in FIG. 3B), In an embodiment, the first hardened coating and/or the second hardened coating comprises one or more gaps or holes in the form of indicia through which the holographic metallic layer can be seen from one side of the security thread or stripe where the first hardened coating, the second hardened coating and the holographic metallic layer are at least partially jointly visible.

Figure 3C:
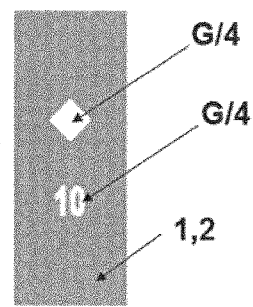
FIG. 3C schematically illustrates gaps in the form of indicia.

As shown in FIG. 3C and when the first hardened coating (1) and/or the second hardened coating (2) comprise one or more gaps (G in FIG. 3C) in the form of indicia, said gaps consist of regions lacking the first hardened coating and/or the second hardened coating as the case may be. The first hardened coating and/or the second hardened coating (1, 2 in FIG. 3C) when comprising one or more gaps G in the form of indicia comprise material-free areas in the form of indicia. In other words, the first hardened coating and/or the second hardened coating (1, 2) (when comprising one or more gaps in the form of indicia) described herein comprise negative writing in the form of indicia. As used herein, the term "negative writing" refers to material-free areas in an otherwise continuous layer. When the hardened coating and/or the second hardened coating comprise one or more gaps in the form of indicia, said one or more gaps allow an observer to see the holographic metallic layer (4) through the one or more gaps (G/4).

Preferably, the indicia described herein are independently selected from the group consisting of symbols, alphanumeric symbols, motifs, geometric patterns, letters, words, numbers, logos, drawings and combinations thereof. In an embodiment, the first hardened coating and/or the second hardened coating have a strip shape (rectangular pattern) and are aligned lengthwise or widthwise with respect to the security thread or stripe.

The first hardened coating may be adjacent to the second hardened coating or may be spaced apart. By "adjacent", it is meant that the first hardened coating and the second hardened coating are in direct contact. By "spaced apart", it is meant that the first hardened coating and the second hardened coating are not in direct contact and that a distance less than 50% of the width of the security thread or stripe, preferably between about 5% and 35% of the width of the security thread or stripe, is present between said first and second hardened coatings. In an embodiment, the first and second hardened coatings are arranged in a spaced apart manner and the holographic metallic layer can be seen through the space from one side of the security thread or stripe where the first hardened coating, the second hardened coating and the holographic metallic layer are at least partially jointly visible.

Figure 4A:
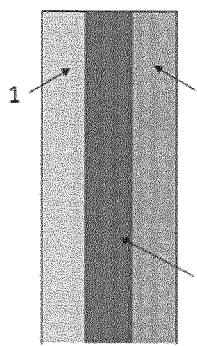
FIG. 4A-Q schematically depict top views of security threads and stripes of the present invention according to several exemplary embodiments.
Figure 4B:
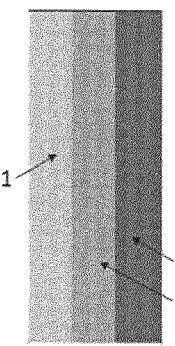
Figure 4C:
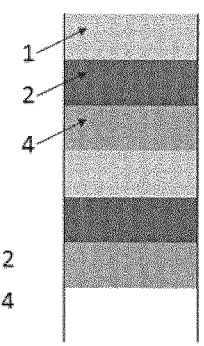
Figure 4D:
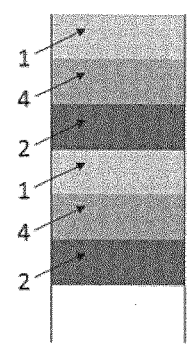
Figure 4E:
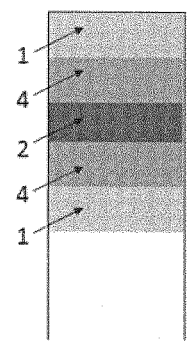
Figure 4F:
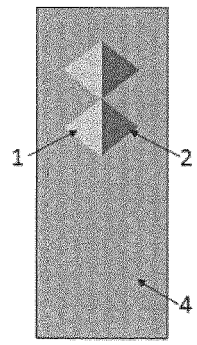
Figure 4G:
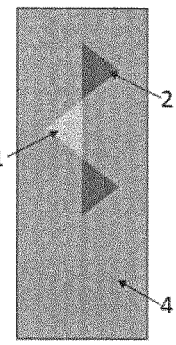
Figure 4H:
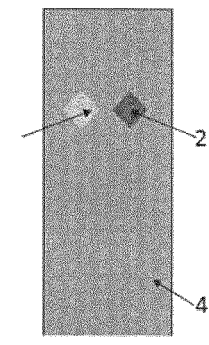

FIG. 4A-Q are top views of examples of security threads or stripes described herein, wherein 1 consist of the first hardened coating, 2 consist of the second hardened coating, 4 consist of the holographic metallic layer, and G/4 and G'/4 consist of gaps through which the holographic metallic layer is visible.

According to one embodiment and as mentioned hereabove, the first hardened coating and/or the second hardened coating consist of indicia, said first hardened coating and second hardened coating may be adjacent to each other or may be spaced apart.

When the first hardened coating (1) and the second hardened coating (2) consist of indicia and as shown in FIGS. 4A, 4C, 4D, and 4F said indicia may be adjacent. Said adjacent indicia may have the same shape (for example two rectangular patterns in FIGS. 4A, 4C and 4D or two triangles in FIG. 4F) or may have a different shape.

When the first hardened coating (1) and the second hardened coating (2) consist of indicia and as shown in FIGS. 4B, 4E, 4H, 4I, 4J, 4K and 4L said indicia may be spaced apart. Said spaced apart indicia may have the same shape (two rectangular patterns in FIGS. 4B and 4E and two diamonds in FIG. 4H) or may have a different shape (a "1" and a "0" in FIG. 4I, a rectangular pattern and a "10" in FIGS. 4J, 4K and 4L).

According to another embodiment and as mentioned hereabove, the first hardened coating and/or the second hardened coating comprise one or more gaps in the form of indicia, When the first hardened coating (1) and the second hardened coating (2) comprise one or more gaps (G) in the form of indicia through which the holographic metallic layer (4) is visible and as shown in FIG. 4N, said gaps may be adjacent. Said adjacent gaps may have the same shape (two triangles in FIG. 4N) or may have a different shape, When the first hardened coating (1) and the second hardened coating (2) comprise one or more gaps (G) in the form of indicia through which the holographic metallic layer (4) is visible and as shown in FIGS. 4M and 4O, said gaps may be spaced apart. Said spaced apart gaps may have the same shape (two diamonds in FIG. 4M) or may have a different shape (a "1" and a "0" in FIG. 4O).

According to another embodiment, one of the first hardened coating and second hardened coating consists of indicia and the other comprises one or more gaps in the form of indicia. For example and as shown in FIGS. 4P and 4O, the first hardened coating (1) consists of indicia and the second hardened coating (2) comprises one or more gaps (G) through which the holographic metallic layer (4) is visible. The indicia made of the first hardened coating (1) may have a same shape as the one or more gaps G (two diamonds in FIG. 4P) or may have a different shape (indicia having the shape of a "10" and gaps having the shape of a "20" in FIG. 4Q). Both of the first hardened coating and second hardened coating comprise a plurality of oriented non-spherical magnetic or magnetizable pigment particles, said non-spherical magnetic or magnetizable pigment particles being the same or being different in the first and second hardened coatings. The first hardened coating and second hardened coating are prepared from coating compositions, i.e. from a first coating composition and a second coating composition respectively.

Preferably, the non-spherical magnetic or magnetizable pigment particles are independently present in an amount from about 2 wt-% to about 40 wt-% in the first coating composition and the second coating composition, more preferably about 4 wt-% to about 30 wt-%, the weight percents being based on the total weight of the first coating composition or the second coating composition as the case may be.

Preferably, the non-spherical magnetic or magnetizable pigment particles of the first plurality and/or the non-spherical magnetic or magnetizable pigment particle of the second plurality are prolate particles or oblate particles, ellipsoid-shaped particles, platelet-shaped particles or needle-shaped particles or a mixture of two or more thereof and still more preferably platelet-shaped particles. Thus, even if the intrinsic reflectivity per unit surface area (e.g. per $\mu m^2$) is uniform across the whole surface of such particle, due to its non-spherical shape, the reflectivity of the particle is non-isotropic as the visible area of the particle depends on the direction from which it is viewed. In one embodiment, the non-spherical magnetic or magnetizable pigment particles having non-isotropic reflectivity due to their non-spherical shape may further have an intrinsic non-isotropic reflectivity, such as for instance in optically variable magnetic pigment particles, due to their structure comprising layers of different reflectivity and refractive indexes. In this embodiment, the non-spherical magnetic or magnetizable pigment particles comprise non-spherical magnetic or magnetizable pigment particles having intrinsic non-isotropic reflectivity, such as non-spherical optically variable magnetic or magnetizable pigment particles. In other words, the first hardened coating and/or the second hardened coating are preferably optically variable coatings thus exhibiting optically variable characteristics. With the aim of exhibiting optically variable properties, at least a part of the first plurality of non-spherical magnetic or magnetizable pigment particles and/or at least a part of the second plurality of non-spherical magnetic or magnetizable pigment particles is constituted by non-spherical optically variable magnetic or magnetizable pigment particles, said pigment particles being preferably independently selected from the group consisting of magnetic thin-film interference pigments, magnetic cholesteric liquid crystal pigments, interference coated pigments comprising one or more magnetic materials and mixtures thereof.

Optically variable properties are known in the field of security printing. Optically variable elements (also referred in the art as goniochromatic elements or colorshifting elements) exhibit a viewing-angle or incidence-angle dependent color, and are used to protect banknotes and other security documents against counterfeiting and/or illegal reproduction by commonly available color scanning, printing and copying office equipment. Optically variable layers or coatings impart a different color impression at different viewing angles By "different color impression", it is meant that the element exhibits a difference of at least one parameter of the CIELAB(1976) system, preferably exhibits a different "a*" value or a different "b*" value or different "a*" and "b*" values at different viewing angles.

For example, the first hardened coating and/or the second hardened coating exhibiting optically variable properties by comprising the non-spherical optically variable magnetic or magnetizable pigment particles described herein exhibit a colorshift upon variation of the viewing angle (e.g. from a viewing angle of about 90° with respect to the plane of the layer or coating to a viewing angle of about 22.5° with respect to the plane of the layer or coating) from a color impression CI1 (e.g. gold) to a color impression CI2 (green). In addition to the overt security provided by the colorshifting property which allows an easy detection, recognition and/or discrimination of the security threads or stripes described herein from their possible counterfeits with the unaided human senses, the colorshifting property may be used as a machine readable tool for the recognition of the security threads or stripes. Thus, the colorshifting properties may simultaneously be used as a covert or semi-covert security feature in an authentication process wherein the optical (e.g. spectral) properties of the security thread or stripe are analyzed. Thus, the colorshifting properties of the first hardened coating and/or the second hardened coating may simultaneously be used as a covert or semi-covert security feature in an authentication process wherein the optical (e.g. spectral) properties of the particles are analyzed.

Suitable examples of non-spherical magnetic or magnetizable pigment particles described herein include without limitation pigment particles comprising a magnetic metal selected from the group consisting of cobalt (Co), iron (Fe), gadolinium (God) and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said non-spherical magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicium oxide (SiO), silicium dioxide ($SiO_2$), titanium oxide ($TiO_2$), and aluminum oxide ($Al_2O_3$), more preferably silicium dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the non-spherical magnetic or magnetizable pigment particles being multilayered structures described hereabove include without limitation NM multilayer structures, A/M/A multilayer structures, A/M/B multilayer structures, A/B/M/A multilayer structures, NB/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

As mentioned above, preferably at least a part of the first plurality of non-spherical magnetic or magnetizable pigment particles and/or at least a part of the second plurality of non-spherical magnetic or magnetizable pigment particles is constituted by non-spherical optically variable magnetic or magnetizable pigment particles. These can more preferably be selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648. Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicium oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicium dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric\reflector/magnetic\reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by a conventional deposition technique of the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to flakes which have to be further processed by grinding, milling (such as for example jet milling processes) or any suitable method so as to obtain pigment particles of the required size. The resulting product consists of flat flakes with broken edges, irregular shapes and different aspect ratios. Further information on the preparation of suitable magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. No. 6,582,781 and U.S. Pat. No. 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. No. 6,582,781 and U.S. Pat. No. 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical magnetic or magnetizable pigment particles described herein may be surface treated so as to protect them against any deterioration that may occur in the coating composition and/or to facilitate their incorporation in the coating composition; typically corrosion inhibitor materials and/or wetting agents may be used.

The security thread or stripe described herein may further comprise at least one color constant layer. According to one embodiment, the security thread or stripe described herein comprises the first hardened coating and/or the second hardened coating exhibiting optically variable properties and a color constant layer, said color constant layer matching the color impression of the first hardened coating or the color impression of the second hardened coating at a viewing angle, provided that the first hardened coating, the second hardened coating, the holographic metallic layer and the color constant layer are at least partially jointly visible from one side of the security thread or stripe. According to another embodiment, the security thread or stripe described herein comprises the first hardened coating and the second hardened coating exhibiting optically variable properties and a color constant layer, said color constant layer matching the color impression of the first hardened coating and/or the color impression of the second hardened coating at a viewing angle, provided that the first hardened coating, the second hardened coating, the holographic metallic layer and the color constant layer are at least partially jointly visible from one side of the security thread or stripe. On the contrary to optically variable coatings that exhibit different colors or color impressions upon variation of the viewing angle, the color constant layer described herein consists of a layer that does not exhibit a color change or color impression change upon variation of the viewing angle. When the color constant layer matches the color impression of the first hardened coating and second hardened coating at one viewing angle, said matching properties may be such that the color constant layer matches the color impression of both hardened coatings at the same angle (e.g. a color constant layer exhibit a color impression CI1, the first hardened coating exhibit a colorshift upon variation of the viewing angle from a color impression CI1 to a color impression CI2 and the second hardened coating exhibit a colorshift upon variation of the viewing angle from a color impression CI1 to a color impression CI2 or CI3) or may be such that the color constant layer matches the color impression of both hardened coatings at a different angle (e.g. a color constant layer exhibit a color impression CI1, the first hardened coating exhibit a colorshift upon variation of the viewing angle from a color impression CI1 to a color impression CI2 and the second hardened coating exhibit a colorshift upon variation of the viewing angle from a color impression CI2 or CI3 to a color impression CI1). The color constant layer described herein is made of a color constant composition preferably comprising from about 1 to about 20 wt-% of one or more dyes and/or from about 0.1 to about 45 wt-% of inorganic pigments, organic pigments or mixtures thereof, the weight percents being based on the total weight of the color constant composition. Dyes suitable for inks are known in the art and are preferably selected from the group comprising reactive dyes, direct dyes, anionic dyes, cationic dyes, acid dyes, basic dyes, food dyes, metal-complex dyes, solvent dyes and mixtures thereof. Typical examples of suitable dyes include without limitation coumarines, cyanines, oxazines, uranines, phtalocyanines, indolinocyanines, triphenylmethanes, naphtalocyanines, indonanaphtalo-metal dyes, anthraquinones, anthrapyridones, azo dyes, rhodamines, squarilium dyes, croconium dyes. Typical examples of dyes suitable for the present invention include without limitation C.I. Acid Yellow 1, 3, 5, 7, 11, 17, 19, 23, 25, 29, 36, 38, 40, 42, 44, 49, 54, 59, 61, 70, 72, 73, 75, 76, 78, 79, 98, 99, 110, 111, 121, 127, 131, 135, 142, 157, 162, 164, 165, 194, 204, 236, 245; C.I. Direct Yellow 1, 8, 11, 12, 24, 26, 27, 33, 39, 44, 50, 58, 85, 86, 87, 88, 89, 98, 106, 107, 110, 132, 142, 144; C.I. Basic Yellow 13, 28, 65; C.I. Reactive Yellow 1, 2, 3, 4, 6, 7, 11, 12, 13, 14, 15, 16, 17, 18, 22, 23, 24, 25, 26, 27, 37, 42; C.I. Food Yellow 3, 4; C.I. Acid Orange 1, 3, 7, 10, 20, 76, 142, 144; C.I., Basic Orange 1, 2, 59; C.I. Food Orange 2; C.I. Orange B; C.I. Acid Red 1, 4, 6, 8, 9, 13, 14, 18, 26, 27, 32, 35, 37, 42, 51, 52, 57, 73, 75, 77, 80, 82, 85, 87, 88, 89, 92, 94, 97, 106, 111, 114, 115, 117, 118, 119, 129, 130, 131, 33, 134, 138, 143, 145, 154, 155, 158, 168, 180, 183, 184, 186, 194, 198, 209, 211, 215, 219, 221, 249, 252, 254, 262, 265, 274, 282, 289, 303, 317, 320, 321, 322, 357, 359; C.I. Basic Red 1, 2, 14, 28; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, 231, 253; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64, 108, 180; C.I. Food Red 1, 7, 9, 14; C.I. Acid Blue 1, 7, 9, 15, 20, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 193, 199, 203, 204, 205, 229, 234, 236, 249, 254, 285; C.I. Basic Blue 1, 3, 5, 7, 8, 9, 11, 55, 81; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, 46, 77; C.I. Food Blue 1, 2; C.I. Acid Green 1, 3, 5, 16, 26, 104; C.I. Basic Green 1, 4; C.I. Food Green 3; C.I. Acid Violet 9, 17, 90, 102, 121; C.I. Basic Violet 2, 3, 10, 11, 21; C.I. Acid Brown 101, 103, 165, 266, 268, 355, 357, 365, 384; C.I. Basic Brown 1; C.I. Acid Black 1, 2, 7, 24, 26, 29 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, 191, 194; C.I. Direct Black 17, 19, 22, 32, 39, 51, 56, 62, 71, 74, 77, 94, 105, 106, 107, 108, 112, 113, 117, 118, 132, 133, 146, 154, 168; C.I. Reactive Black 1, 3, 4, 5, 6, 8, 9, 10, 12, 13, 14, 18, 31; C.I. Food Black 2; C.I. Solvent Yellow 19, C.I. Solvent Orange 45, C.I. Solvent Red 8, C.I. Solvent Green 7, C.I. Solvent Blue 7, C.I. Solvent Black 7; C.I. Disperse Yellow 3, C.I. Disperse Red 4, 60, C.I. Disperse Blue 3, and metal azo dyes disclosed in U.S. Pat. No. 5,074,914, U.S. Pat. No. 5,997, 622, U.S. Pat. No. 6,001,161, JP 02-080470, JP 62-190272, JP 63-218766. Suitable dyes for the present invention may be infrared absorbing dyes, luminescent dyes.

Typical examples of organic and inorganic pigments suitable for the present invention include without limitation C.I. Pigment Yellow 12, C.I. Pigment Yellow 42, C.I. Pigment Yellow 93, 109, C.I. Pigment Yellow 110, C.I. Pigment Yellow 147, C.I. Pigment Yellow 173, C.I. Pigment Orange 34, C.I. Pigment Orange 48, C.I. Pigment Orange 49, C.I. Pigment Orange 61, C.I. Pigment Orange 71 C.I. Pigment Orange 73, C.I. Pigment Red 9, C.I. Pigment Red 22, C.I. Pigment Red 23, C.I. Pigment Red 67, C.I. Pigment Red 122, C.I. Pigment Red 144, C.I. Pigment Red 146, C.I. Pigment Red 170, C.I. Pigment Red 177, C.I. Pigment Red 179, C.I. Pigment Red 185, C.I. Pigment Red 202, C.I. Pigment Red 224, C.I. Pigment Red 242, C.I. Pigment Red 254, C.I. Pigment Red 264, C.I. Pigment Brown 23, C.I. Pigment Blue 15, C.I. Pigment Blue 15:3, C.I. Pigment Blue 60, C.I. Pigment Violet 19, C.I. Pigment Violet 23, C.I. Pigment Violet 32, C.I. Pigment Violet 37, C.I. Pigment Green 7, C.I. Pigment Green 36, C.I. Pigment Black 7, C.I. Pigment Black 11, metal oxides such as titanium dioxide, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black, mixed metal oxides, azo, azomethine, methine, anthraquinone, phthalocyanine, perinone, perylene, diketopyrrolopyrrole, thioindigo, thiazinindigo, dioxazine, iminoisoindoline, iminoisoindolinone, quinacridone, flavanthrone, indanthrone, anthrapyrimidine and quinophthalone pigments.

The first hardened coating and the second hardened coating described herein are prepared by i) applying the respective coating composition described herein, ii) orienting the non-spherical magnetic or magnetizable pigment particles by exposing the respective coating composition in a first state to the magnetic field of a magnetic-field-generating device and iii) hardening the respective coating composition so as to fix the non-spherical magnetic or magnetizable pigment particles in their adopted positions and orientations so as to obtain the first hardened coating or second hardened coating as the case may be. The first coating composition, the second coating composition and the color constant composition when present are preferably independently selected from the group consisting of radiation curable compositions, thermal drying compositions and combination thereof.

According to one aspect of the present invention, the first coating composition described herein and/or the second coating composition described herein and/or the color constant composition when present consist of thermal drying coating compositions. Thermal drying coating compositions consist of coating compositions of any type of aqueous compositions or solvent-based compositions which are dried by hot air, infrared or by a combination of hot air and infrared. Typical examples of thermal drying coating compositions comprises components including without limitation resins such as polyester resins, polyether resins, vinyl chloride polymers and vinyl chloride based copolymers, nitrocellulose resins, cellulose acetobutyrate or acetopropionate resins, maleic resins, polyamides, polyolefins, polyurethane resins, functionalized polyurethane resins (e.g. cartoxylated polyurethane resins), polyurethane alkyd resins, polyurethane-(meth)acrylate resins, urethane-(meth) acrylic resins, styrene (meth)acrylate resins or mixtures thereof. The term "(meth)acrylate" or "(meth)acrylic" in the context of the present invention refers to the acrylate as well as the corresponding methacrylate or refers to the acrylic as well as the corresponding methacrylic. As used herein, the term "solvent-based compositions" refers to compositions whose liquid medium or carrier substantially consists of one or more organic solvents. Examples of such solvents include without limitation alcohols (such as for example methanol, ethanol, isopropanol, n-propanol, ethoxy propanol, n-butanol, sec-butanol, tert-butanol, iso-butanol, 2-ethylhexyl-alcohol and mixtures thereof); polyols (such as for example glycerol, 1,5-pentanediol, 1,2,6-hexanetriol and mixtures thereof); esters (such as for example ethyl acetate, n-propyl acetate, n-butyl acetate and mixtures thereof); carbonates (such as for example dimethyl carbonate, diethylcarbonate, di-n-butylcarbonate, 1,2-ethylencarbonate, 1,2-propylenecarbonate, 1,3-propylencarbonate and mixtures thereof); aromatic solvents (such as for example toluene, xylene and mixtures thereof); ketones and ketone alcohols (such as for example acetone, methyl ethyl ketone, methyl isobutyl ketone, cyclohexanone, diacetone alcohol and mixtures thereof); amides (such as for example dimethylformamide, dimethyl-acetamide and mixtures thereof); aliphatic or cycloaliphatic hydrocarbons; chlorinated hydrocarbons (such as for example dichloromethane); nitrogen-containing heterocyclic compound (such as for example N-methyl-2-pyrrolidone, 1,3-dimethyl-2-imidazolidone and mixtures thereof); ethers (such as for example diethyl ether, tetrahydrofuran, dioxane and mixtures thereof); alkyl ethers of a polyhydric alcohol (such as for example 2-methoxyethanol, 1-methoxypropan-2-ol and mixtures thereof); alkylene glycols, alkylene thioglycols, polyalkylene glycols or polyalkylene thioglycols (such for example ethylene glycol, polyethylene glycol (such as for example diethylene glycol, triethylene glycol, tetraethylene glycol), propylene glycol, polypropylene glycol (such as for example dipropylene glycol, tripropylene glycol), butylene glycol, thiodiglycol, hexylene glycol and mixtures thereof); nitriles (such as for example acetonitrile, propionitrile and mixtures thereof), and sulfur-containing compounds (such as for example dimethylsulfoxide, sulfolan and mixtures thereof). Preferably, the one or more organic solvents are selected from the group consisting of alcohols, esters and mixtures thereof.

According to another aspect of the present invention, the first coating composition described herein and/or the second coating composition described herein and/or the color constant composition when present consist of radiation curable coating compositions. Radiation curable coating compositions include compositions that may be cured UV-visible light radiation (hereafter referred as UV-Vis-curable) or by E-beam radiation (hereafter referred as EB). Radiation curable coating compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

Preferably, the coating compositions described herein consist of UV-Vis-curable coating compositions. Preferably the UV-Vis-curable coating compositions described herein are prepared from oligomers (also referred in the art as prepolymers) selected from the group consisting of radically curable compounds, cationically curable compounds and mixtures thereof. Cationically curable compounds are cured by cationic mechanisms consisting of the activation by energy of one or more photoinitiators which liberate cationic species, such as acids, which in turn initiate the polymerization so as to form the binder. Radically curable compounds are cured by free radical mechanisms consisting of the activation by energy of one or more photoinitiators which liberate free radicals which in turn initiate the polymerization so as to form the binder. UV-Vis curing of a monomer, oligomer or prepolymer may require the presence of one or more photoinitiators and may be performed in a number of ways. As known by those skilled in the art, the one or more photoinitiators are selected according to their absorption spectra and are selected to fit with the emission spectra of the radiation source. Depending on the monomers, oligomers or prepolymers used in the UV-Vis-curable coating compositions described herein, different photoinitiators might be used. Suitable examples of free radical photoinitiators are known to those skilled in the art and include without limitation acetophenones, benzophenones, alpha-aminoketones, alpha-hydroxyketones, phosphine oxides and phosphine oxide derivatives and benzyldimethyl ketals.

Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts). Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures thereof. The one or more photoinitiators comprised in the UV-Vis-curable coating compositions are preferably present in an amount from about 0.1 wt-% to about 20 wt-%, more preferably about 1 wt-% to about 15 wt-%, the weight percents being based on the total weight of the UV-Vis-curable coating compositions.

Alternatively, dual-cure coating compositions may be used; these coating compositions combine thermal drying and radiation curing mechanisms. Typically, such compositions are similar to radiation curing compositions but include a volatile part constituted by water and/or by solvent. These volatile constituents are evaporated first using hot air and/or IR driers, and UV-Vis drying is then completing the hardening process.

The first coating composition described herein and/or the second coating composition described herein and/or the color constant composition when used may further comprise one or more machine readable materials. When present, the one or more machine readable materials are preferably independently selected from the group consisting of magnetic materials, luminescent materials, electrically conductive materials, infrared-absorbing materials and mixtures thereof. As used herein, the term "machine readable material" refers to a material which exhibits at least one distinctive property which is detectable by a device or a machine, and which can be comprised in a coating or layer so as to confer a way to authenticate said coating or article comprising said coating by the use of a particular equipment for its detection and/or authentication.

The first coating composition described herein and/or the second coating composition described herein and/or the color constant composition when used may independently further comprise one or more additives including without limitation compounds and materials which are used for adjusting physical, rheological and chemical parameters of the composition such as the viscosity (e.g. solvents and surfactants), the consistency (e.g. anti-settling agents, fillers and plasticizers), the foaming properties (e.g. antifoaming agents), the lubricating properties (waxes), UV stability (photosensitizers and photostabilizers) and adhesion properties, etc. Additives described herein may be present in the coating compositions described herein in amounts and in forms known in the art, including in the form of so-called nano-materials where at least one of the dimensions of the particles is in the range of 1 to 1000 nm.

The first coating composition described herein and/or the second coating composition described herein and/or the color constant composition when used may be independently prepared by dispersing or mixing the non-spherical magnetic or magnetizable pigment particles described herein, the one or more dyes described therein and/or the inorganic pigments, organic pigments or mixtures thereof described herein as the case may be, and the one or more additives when present in the presence of a binder described herein, thus forming liquid compositions. When present, the one or more photoinitiators may be added to the composition either during the dispersing or mixing step of all other ingredients or may be added at a later stage, i.e. after the formation of the liquid composition.

The security thread or stripe described herein comprises a holographic metallic layer. Holographic metallic layers are well known in the field of the protection of security documents or articles against counterfeiting and/or illegal reproduction. The holographic metallic layer consists of a metallic relief pattern preferably present in an embossing lacquer layer. The relief pattern provides a hologram or other surface relief-based structure. The relief pattern can take various forms including diffraction gratings, holographic patterns such as two-dimensional and three-dimensional holographic images, corner cube reflectors, zero order diffraction patterns, moiré patterns, or other light interference patterns, including those based on microstructures having dimensions in the range from about 0.1 µm to about 10 µm and various combinations of the above such as hologram/grating images, or other interference patterns. The relief pattern is made of a reflective metal including without limitation aluminum, silver, nickel, silver-palladium, silver-copper alloy, copper, gold, and the like. The holographic metallic layer described herein may comprise one or more demetalized parts in the form of indicia in negative writing (also referred in the art as clear text) or positive writing as mentioned hereafter for metalized substrates.

Methods for producing holographic metallic layers are well known by those skilled in the art. For example, a surface of layer may be embossed by well-known methods, such as by pressing it in contact with a heated nickel embossing shim at high pressure. Other methods include photolithography and molding of a plastic substrate against a patterned surface. Holographic metallic layers can be produced from a thermoplastic film that has been embossed by heat softening the surface of the film and then passing the film through embossing rollers that impart the diffraction grating or holographic image onto the softened surface. In this way, sheets of effectively unlimited length can be formed with the diffraction grating or holographic image thereon. Alternatively, holographic metallic layers can be made by passing a roll of plastic film coated with an ultraviolet (UV) curable polymer, such as PMMA, through a set of UV transparent rollers whereby the rollers set a pattern into the UV curable polymer and the polymer is cured by a UV light that passes through the UV transparent rollers. One the associated surface relief structure is prepared, the reflective metal described herein is deposited in a desired pattern.

The security thread or stripe described herein comprises a first transparent substrate and a second transparent substrate, wherein one of said two transparent substrates or both of said transparent substrates facing the environment, i.e. facing outwardly, and wherein the first hardened coating, the second hardened coating, the color constant layer when present, and the holographic metallic layer are at least partially jointly visible from one side of the security thread or stripe. Preferably, the first transparent substrate and the second transparent substrate are independently selected from the group consisting of plastics, polymers, composite materials, metals, metalized materials and mixtures thereof. Preferably, the first transparent substrate and the second transparent substrate are independently made of one or more plastics or polymers preferably selected form the group consisting of polyolefins (e.g. polyethylene and polypropylene), polyamides, polyesters (e.g. poly(ethylene terephthalate) (PET), poly(1,4-butylene terephthalate) (PBT) and poly(ethylene 2,6-naphthoate) (PEN)), polyvinylchlorides (PVC) and mixtures thereof. The two transparent substrates described herein may be different or may be the same. One or both of the transparent substrates may be independently made of a metalized material comprising demetalized parts so that the first hardened coating, the second hardened coating and the holographic metallic layer are at least partially jointly visible from one side of the side of the security thread or stripe. Metalized materials include without limitation plastic or polymer materials such as those described herein having a metal, said metal including without limitation aluminum (Al), chromium (Cr), copper (Cu), gold (Au), iron (Fe), nickel (Ni), silver (Ag), combinations thereof or alloys of two or more of the aforementioned metals. Metallization of the material described hereabove may be done by an electrodeposition process, a high-vacuum coating process or by a sputtering process and may be continuous or discontinuous. Typically, the metal has a thickness between about 1 and about 100 nanometers (nm). The demetalized parts described herein may be in the form of indicia in negative writing (also referred in the art as clear text) or positive writing. By "positive writing", it is meant that the indicia consist of a metal surrounded by a demetalized area and by "negative writing"; it is meant that the indicia consist of negative text, i.e. a metal material comprising demetalized parts in the form of indicia in negative writing. The demetalized parts may be produced by processes known to those skilled in the art such as for example chemical etching, laser etching or washing methods. The substrate described herein may be colored.

The security thread or stripe described herein may further comprise one or more additional layers, said one or more additional layers being preferably selected from the group consisting of adhesive layers, lacquers, machine readable layers, hiding layers and combinations thereof, provided that the first hardened coating, the second hardened coating, the color constant layer when present and the holographic metallic layer are at least partially jointly visible from one side of the security thread or stripe. When present, the one or more additional layers may be continuous or discontinuous. The one or more additional layers described herein may be placed on one side, on both sides of the transparent substrates described herein or between the coatings and layers described herein.

The security thread or stripe described herein may further comprise one or more adhesive layers, preferably one or more thermoadhesive layers, on at least one surface of said security thread or stripe so as to provide adherence to a security document upon incorporation of the security thread or stripe into or onto said security document.

With the aim of facilitating an automatic authenticity check of the security thread or stripe described herein or a security document comprising said security thread or stripe by an authentication apparatus such as for example an automatic teller machine (ATMs), the security thread or stripe described herein may further comprise one or more machine readable layers, provided that the first hardened coating, the second hardened coating, the color constant layer when present and the holographic metallic layer are at least partially jointly visible from one side of the security thread or stripe. Said one or more machine readable layers may be continuous or discontinuous. When present, the one or more machine readable layers preferably comprise a machine readable material selected from the group consisting of magnetic materials, luminescent materials, electrically conductive materials, infrared-absorbing materials and mixtures thereof.

With the aim of further increasing the resistance against counterfeiting or illegal reproduction of the security thread or stripe described herein, it might be advantageous to apply one or more hiding layers so as to camouflage any information that is present in the security thread or stripe such as for example any information related to the one or more machine readable layers described hereabove. For example, magnetic or other machine readable information which is visually discernible could be more easily counterfeited if the potential counterfeiter can detect the presence and/or the placement of the magnetic regions to read. If the magnetic or other machine readable information cannot be visually seen, the counterfeiter will not be motivated to reproduce this information and therefore the counterfeiting will fail and be easily detected if illegally reproduced. Typical examples of hiding layers include without limitation aluminum layers, black layers, white layers, opaque colored layers, metalized layers and combination of thereof. As mentioned hereabove for the one or more machine readable layers, the one or more hiding layers may be may be continuous or discontinuous and are preferably apply on the one or more machine readable layers provided that the first hardened coating, the second hardened coating, the color constant layer when present and the holographic metallic layer are at least partially jointly visible from one side of the security thread or stripe.

The present invention provides processes for producing security threads or stripes exhibiting a plural rolling bar effect described herein and security threads or stripes obtained thereof, said processes comprising the steps of laminating a) a first structure comprising the first transparent substrate described herein, the holographic metallic layer described herein and the first hardened coating comprising the non-spherical magnetic or magnetizable pigment particles oriented so as to follow a convex curvature when viewed from the side carrying the first hardened coating with b) a second structure comprising the second transparent substrate described herein and the second hardened coating comprising the non-spherical magnetic or magnetizable pigment particles oriented so as to follow a convex curvature when viewed from the side carrying the second hardened coating, wherein the first hardened coating and the second hardened coating are comprised between the two transparent substrates so as to form a laminated structure and wherein the holographic metallic layer is either comprised between the two transparent substrates or faces the environment, wherein the first hardened coating, the second hardened coating and the holographic metallic layer are at least partially jointly visible from one side of the security thread or stripe, and wherein the laminated structure comprises one of the first hardened coating and second hardened coating comprising non-spherical magnetic or magnetizable pigment particles having an orientation following a convex curvature and the other of the first hardened coating or the second hardened coating comprising non-spherical the magnetic or magnetizable pigment particles having an orientation following a concave curvature so as to form a plural rolling bar effect. The present invention provides a simpler and more efficient process for producing highly dynamic security threads or stripes in comparison with the prior art. The security threads or stripes obtained therefrom exhibit a highly dynamic appearance when tilted.

The process for producing the security thread or stripe described herein invention may further comprise a step of applying one or more adhesive layers, preferably one or more thermoadhesive layers, on one or both sides of the laminated structure obtained as described hereabove. Applying one or more adhesive layers, preferably one or more thermoadhesive layers, on one or both sides of the laminated structure described herein provides adherence to a security document upon incorporation of the thread or stripe into or onto said security document.

The first structure described herein is preferably prepared by a process comprising the steps of i) applying by a printing process selected from the group consisting of rotogravure, screen printing and flexography, on the first transparent substrate and the holographic metallic layer the first coating composition described herein, ii) orienting the non-spherical magnetic or magnetizable pigment particles by exposing the first coating composition in a first state to the magnetic field of a magnetic-field-generating device so that the non-spherical magnetic or magnetizable pigment particles follow a convex curvature when viewed from the side carrying the first hardened coating, and iii) hardening the first coating composition to a second state so as to fix the non-spherical magnetic or magnetizable pigment particles in their adopted positions and orientations so as to obtain the first hardened coating. The second structure described herein is preferably prepared by a process comprising the steps of i) applying by a printing process selected from the group consisting of rotogravure, screen printing and flexography, on the second transparent substrate the second coating composition described herein, ii) orienting the non-spherical magnetic or magnetizable pigment particles by exposing the second coating composition in a first state to the magnetic field of a magnetic-field-generating device so that the non-spherical magnetic or magnetizable pigment particles follow a convex curvature when viewed from the side carrying the second hardened coating, and iii) hardening the second coating composition to a second state so as to fix the non-spherical magnetic or magnetizable pigment particles in their adopted positions and orientations so as to obtain the second hardened coating.

The first coating composition is preferably applied by a printing process as described hereabove so as to form a layer while keeping one or more gaps in the form of indicia or by applying the first coating composition in the form of indicia; the same applies for the second coating composition.

The processes for producing the first structure and the second structure described herein may further comprise a step iv) of applying, preferably by a printing process selected from the group consisting of offset, rotogravure, screen printing and flexography, a color constant composition. Depending on the final design of the security thread or stripe, said color constant composition may be applied and hardened before the application, orientation and hardening steps of the first coating composition or second coating composition as the case may be or may be applied and hardened after the application, orientation and hardening steps of the first coating composition or second coating composition as the case may be.

As mentioned hereabove, the first coating composition, the second coating composition and optional color constant composition when present are preferably applied by a printing process so as to form the first hardened coating, the second hardened coating and the optional color constant layer respectively. Using printing processes for producing the security threads or stripes described herein provides a high flexibility in terms of designs and color combinations, Subsequently to the application by the printing process described herein of the first coating composition, the second coating composition and the color constant composition when present, said compositions are hardened. The hardening steps described herein may be any step that increases the viscosity of the composition such that a substantially solid material adhering to the substrate is formed. The hardening steps described herein may independently involve a physical process based on the evaporation of a volatile component, such as a solvent, and/or water evaporation (i.e. physical drying). Herein, hot air, infrared or a combination of hot air and infrared may be used. Alternatively, the hardening steps described herein may independently include a chemical reaction which is not reversed by a simple temperature increase that may occur during a typical use of the security thread described, such as a curing, polymerizing or cross-linking of the binder and optional initiator compounds and/or optional cross-linking compounds comprised in the composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing).

The steps of exposing the first coating composition and the second coating composition described herein to the magnetic field of a magnetic-field-generating device (orientation step, step ii)) so that the non-spherical magnetic or magnetizable pigment particles follow a convex curvature when viewed from the side carrying the first hardened coating or the second hardened coating as the case may be can be independently carried out either partially simultaneously or simultaneously with the step of applying the respective coating composition (applying step, step i)) or subsequently to said step. That is, both steps may be independently performed partially simultaneously or simultaneously or subsequently. Preferably, the orientation steps ii) and the applying steps i) for preparing the first structure and the second structure described herein are independently carried out partially simultaneously or simultaneously.

The hardening steps iii) for preparing the first structure and the second structure described hereabove so as to fix the non-spherical magnetic or magnetizable pigment particles in their adopted positions and orientations in a desired pattern, may be independently performed partially simultaneously with the orientation steps ii) (or subsequently to the orientation steps ii). Preferably, the hardening steps iii) for preparing the first structure and the second structure described herein are independently carried out partially simultaneously or simultaneously with the orientation steps ii). It is particularly preferred to harden the first coating composition and the second coating composition by radiation curing and more preferably by UV-Vis light radiation curing, since these technologies advantageously lead to very fast curing processes and hence drastically decrease the preparation time of the security thread described herein. Moreover, radiation curing has the advantage of producing an almost instantaneous increase in viscosity of the optically variable composition after exposure to the curing radiation, thus minimizing any further movement of the particles. In consequence, any loss of information after the magnetic orientation step can essentially be avoided.

The process for producing the security thread or stripe described herein may further comprise a step of applying, preferably by a printing process, one or more protective layers on the outermost layer or coating of the laminated structure described herein, said step being carried out after step iii) or step iv) when performed. The one or more protective layers may be more or less glossy. Protective layers are typically made of protective varnishes, wherein said varnishes may be radiation curable compositions, thermal drying compositions or any combination thereof.

Lamination may be performed by a conventional lamination process known in the art such as for example a processes consisting of applying heat and/or pressure on the first and second structures optionally further comprising an additional material present on at least one of the surface to be bonded. Typically, the additional material consists of a conventional lamination adhesive layer or a conventional tie layer which may be water-based, solvent-based, solvent-free or UV-curable compositions. In an embodiment, the process comprises a step of applying one or more adhesive layers on the first structure and/or on the second structure to adhere the first and second structures together in the laminated structure.

A further step consisting of slicing the security threads or stripes described herein may be achieved so as to provide security threads or stripes having preferably a width, i.e. dimension in the transverse direction, between about 0.5 mm and about 30 mm, more preferably between about 0.5 mm and about 5 mm. When a step of applying one or more adhesive layers, preferably one or more thermoadhesive layers, on one or both sides of the structure obtained under step b) or d) described herein is performed, the step of slicing the structure is carried out subsequently to the applying one or more adhesive layers step.

The security threads or stripes described herein are particularly suitable for the protection of a security document against counterfeiting, fraud or illegal reproduction. Also described herein are security documents comprising said security threads or stripes.

Security documents are usually protected by several security features which are chosen from different technology fields, manufactured by different suppliers, and embodied in different constituting parts of the security document. To break the protection of the security document, the counterfeiter would need to obtain all of the implied materials and to get access to all of the required processing technology, which is a hardly achievable task. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, entrance tickets and the like. The term "value commercial good" refers to packaging material, in particular for pharmaceutical, cosmetics, electronics or food industry that may comprise one or more security features in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents such as passports, identity cards, driving licenses and the like and more preferably banknotes.

With the aim of increasing the wear and soil resistance or with the aim of modifying the optical gloss or aesthetic appearance of the security document described herein, the security document described herein may further comprise one or more protective layers such as those described hereabove.

Also described herein are processes for producing a security document comprising the security thread or stripe described herein and security documents obtained thereof. The processes for producing a security document comprising the security thread or stripe described herein comprising the steps of a) producing the security thread or stripe described herein, preferably by the process described herein and b) at least partially embedding in said security document the security thread or stripe obtained under step a) or mounting the security thread or stripe obtained under step a) on the surface of the security document.

As mentioned hereabove, the security thread or stripe described herein may be at least partially embedded into the security document as a windowed security thread or stripe so that said security thread or stripe is at least partially visible from one side of the security document. When the security document comprises a substrate being a security paper, the security thread or stripe described herein may be at least partially embedded incorporated in the security paper during manufacture by techniques commonly employed in the paper-making industry. For example, the security thread or stripe described herein may be pressed within wet paper fibers while the fibers are unconsolidated and pliable, thus resulting in the security thread or stripe being totally embedded in the resulting security paper. The security thread or stripe described herein may also be fed into a cylinder mold papermaking machine, cylinder vat machine, or similar machine of known type, resulting in partial embedment of the security thread or stripe within the body of the finished paper (i.e. windowed paper).

Alternatively, the security thread or stripe described herein may be disposed completely on the surface of the security document as a transfer element. In such as case, the security thread or stripe described herein may be mounted on the surface of the security document by any known techniques including without limitation applying a pressure-sensitive adhesive to a surface of the security thread or stripe, applying a heat activated adhesive to a surface of the security thread or stripe or using thermal transfer techniques.

The invention claimed is:

1. A security thread or stripe comprising:
   a) a first hardened coating comprising a first plurality of oriented non-spherical magnetic or magnetizable pigment particles,
   b) a second hardened coating comprising a second plurality of oriented non-spherical magnetic or magnetizable pigment particles,
   c) a holographic metallic layer,
   wherein at least one of the first hardened coating and the second hardened coating comprise one or more gaps forming indicia, and
   wherein at least one of the first hardened coating and/or the second hardened coating are optically variable coatings and
   d) a color constant layer having a color matching a color impression of at least one of the first hardened coating and/or second hardened coating at one viewing angle, said color constant layer being present in at least one of the one or more gaps forming indicia,
   wherein the first hardened coating, the second hardened coating, the holographic metallic layer and the color constant layer are at least partially jointly visible from one side of the security thread or stripe, and
   wherein the first plurality of oriented non-spherical magnetic or magnetizable pigment particles are oriented so as to follow a convex curvature when viewed from the one side of the security thread or stripe and the second plurality of oriented non-spherical magnetic or magnetizable pigment particles are oriented so as to follow a concave curvature when viewed from the one side of the security thread or stripe, thereby forming a plural rolling bar effect.

2. The security thread or stripe according to claim 1, further comprising a first transparent substrate and a second transparent substrate independently made of one or more plastics or polymers.

3. The security thread or stripe according to claim 2, wherein the one or more plastics or polymers are selected from the group consisting of polyolefins, polyamides, polyesters, polyvinylchlorides and mixtures thereof.

4. The security thread or stripe according to claim 1, wherein at least one of: at least a part of the first plurality of oriented non-spherical magnetic or magnetizable pigment particles and/or at least a part of the second plurality of oriented non-spherical magnetic or magnetizable pigment particles is constituted by non-spherical optically variable magnetic or magnetizable pigment particles selected from the group consisting of magnetic thin-film interference pigments, magnetic cholesteric liquid crystal pigments, interference coated pigments comprising one or more magnetic materials and mixtures thereof.

5. The security thread or stripe according to claim 1, further comprising one or more additional layers selected from the group consisting of adhesive layers, lacquers, machine readable layers, hiding layers and combinations thereof.

6. The security thread or stripe according to claim 1 further comprising a first transparent substrate and a second transparent substrate,
   wherein a first structure comprises the first transparent substrate, the holographic metallic layer and the first hardened coating comprising the oriented non-spherical magnetic or magnetizable pigment particles oriented to follow a convex curvature when viewed from a side carrying the first hardened coating and a second structure comprises the second transparent substrate and the second hardened coating comprising the oriented non-spherical magnetic or magnetizable pigment particles oriented to follow a convex curvature when viewed from a side carrying second hardened coating,
   wherein the first structure and the second structure are laminated to one another so that the first hardened coating and the second hardened coating are arranged between the two transparent substrates and the holographic metallic layer is arranged between the two transparent substrates or to face the environment.

7. A process for making a security thread or stripe having at least one viewable side according to claim 1, comprising:
   laminating a) a first structure comprising a first transparent substrate, a holographic metallic layer and a first hardened coating comprising non-spherical magnetic or magnetizable pigment particles oriented to follow a curvature when viewed from a side carrying the first hardened coating with b) a second structure comprising a second transparent substrate and a second hardened coating comprising non-spherical magnetic or magnetizable pigment particles oriented to follow a curvature when viewed from a side carrying second hardened coating and c) a color constant layer,
   wherein, in the laminated first and second structures, the first hardened coating and the second hardened coating are arranged between the two transparent substrates and the holographic metallic layer is arranged between the two transparent substrates or to face the environment,
   wherein the first hardened coating, the second hardened coating and the holographic metallic layer are at least partially jointly visible from the at least one viewable side of the security thread or stripe, and
   wherein, in the laminated first and second structures, the orientation of the curvature of the non-spherical magnetic or magnetizable pigment particles of one of the first hardened coating and the second hardened coating follow a convex curvature and the orientation of the curvature of the non-spherical magnetic or magnetizable pigment particles of one of the first hardened coating and the second hardened coating follow a concave curvature when viewed from the at least one viewable side of the security thread or stripe, thereby forming a plural rolling bar effect.

8. The process of claim 7, wherein the first structure is prepared by a process comprising:
   i) applying by a printing process selected from the group consisting of rotogravure, screen printing and flexography, on the first transparent substrate and the holographic metallic layer the first coating composition,
   ii) orienting the non-spherical magnetic or magnetizable pigment particles by exposing the first coating composition in a first state to a magnetic field of a magnetic-field-generating device so that the non-spherical magnetic or magnetizable pigment particles follow the one of the convex or the concave curvature when viewed from the side carrying the first hardened coating, and
   iii) hardening the first coating composition to a second state to fix the orientations of the non-spherical magnetic or magnetizable pigment particles to obtain the first hardened coating, and wherein the second structure is prepared by a process comprising: i) applying by a printing process selected from the group consisting of rotogravure, screen printing and flexography, on the second transparent substrate the second coating composition, ii) orienting the non-spherical magnetic or magnetizable pigment particles by exposing the second coating composition in a first state to a magnetic field of a magnetic-field-generating device so that the non-spherical magnetic or magnetizable pigment particles follow the other of the convex or the concave curvature when viewed from the side carrying the second hardened coating, and iii) hardening the second coating composition to a second state to fix the orientations of the non-spherical magnetic or magnetizable pigment particles to obtain the second hardened coating.

9. The process according to claim 8, wherein the applying of the first coating composition and the applying of the second coating composition are independently carried out one of: partially simultaneously or simultaneously with the orienting of the non-spherical magnetic or magnetizable pigment particles in the first coating composition and with the orienting of the non-spherical magnetic or magnetizable pigment particles in the second coating composition, respectively.

10. The process according to claim 8, wherein the hardening of the first coating composition and of the second coating composition for preparing the first structure and the second structure, respectively, are independently carried out partially simultaneously with the respective orienting of the non-spherical magnetic or magnetizable pigment particles in the first coating composition and with the orienting of the non-spherical magnetic or magnetizable pigment particles in the second coating composition.

11. A protected security document, comprising:
   the security thread or stripe according to claim 1 being connected to a security document,
   wherein the configuration of the security thread or stripe structure protects the security document against counterfeiting, fraud or illegal reproduction.

12. A security document comprising a security thread or stripe recited in claim 1.

13. A process for producing the security document recited in claim 1, said process comprising:
   a) producing the security thread or stripe, and
   b) at least partially embedding in said security document the produced security thread or stripe or mounting the produced security thread or stripe on the surface of the security document.

* * * * *